US012608998B2

(12) United States Patent
Shepherd et al.

(10) Patent No.: US 12,608,998 B2
(45) Date of Patent: Apr. 21, 2026

(54) GAMING ESTABLISHMENT ACCOUNT REFUNDING FOR LACK OF HIGH FREQUENCY TRANSACTIONS

(71) Applicant: IGT, Las Vegas, NV (US)

(72) Inventors: Jeffery Shepherd, Reno, NV (US);
Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 437 days.

(21) Appl. No.: 18/333,314

(22) Filed: Jun. 12, 2023

(65) Prior Publication Data

US 2024/0412595 A1     Dec. 12, 2024

(51) Int. Cl.
| | |
|---|---|
| *G07F 17/32* | (2006.01) |
| *G06Q 20/10* | (2012.01) |
| *G06Q 20/40* | (2012.01) |
| *G06Q 50/34* | (2012.01) |

(52) U.S. Cl.
CPC ......... *G07F 17/3244* (2013.01); *G06Q 20/10* (2013.01); *G06Q 20/407* (2013.01); *G06Q 50/34* (2013.01); *G07F 17/3223* (2013.01); *G07F 17/3237* (2013.01); *G07F 17/3288* (2013.01)

(58) Field of Classification Search
CPC ............. G07F 17/3244; G07F 17/3237; G07F 17/3223; G07F 17/3288; G06Q 20/10; G06Q 20/407; G06Q 50/34
USPC ......................................................... 463/25
See application file for complete search history.

(56) References Cited

U.S. PATENT DOCUMENTS

| | | | | |
|---|---|---|---|---|
| 5,902,983 | A | * | 5/1999 | Crevelt ................... G07F 17/32 |
| | | | | 463/20 |
| 10,621,826 | B2 | | 4/2020 | Higgins et al. |
| 10,643,426 | B2 | | 5/2020 | Higgins et al. |
| 10,891,823 | B2 | | 1/2021 | Mohrhardt et al. |
| 11,046,066 | B2 | | 6/2021 | Barnhart |
| 11,164,420 | B2 | | 11/2021 | Shepherd et al. |
| 11,227,466 | B2 | | 1/2022 | Rousseau et al. |
| 11,417,170 | B2 | | 8/2022 | Shepherd et al. |
| 11,521,461 | B2 | | 12/2022 | Shepherd et al. |
| 2011/0035319 | A1 | | 2/2011 | Brand et al. |
| 2011/0201408 | A1 | | 8/2011 | Gagner et al. |
| 2012/0129591 | A1 | * | 5/2012 | Jahanshahi ............. G07F 17/32 |
| | | | | 463/25 |
| 2013/0090155 | A1 | | 4/2013 | Johnson |
| 2013/0267324 | A1 | | 10/2013 | Froy et al. |
| 2013/0274003 | A1 | * | 10/2013 | Costello .............. G07F 17/3244 |
| | | | | 463/25 |
| 2014/0141866 | A1 | | 5/2014 | Irwin et al. |
| 2015/0243133 | A1 | | 8/2015 | Nicholas |
| 2016/0117651 | A1 | * | 4/2016 | Davis ................. G06Q 20/3255 |
| | | | | 705/40 |
| 2016/0125408 | A1 | | 5/2016 | Crawford |

(Continued)

*Primary Examiner* — Pierre E Elisca

(74) *Attorney, Agent, or Firm* — Neal, Gerber & Eisenberg LLP

(57) ABSTRACT

Systems and methods that, upon an occurrence of a refunding event associated with a period of inactivity of transactions against a frequent transaction account, transfer of an amount of funds from the frequent transaction account to a gaming establishment account, and display a balance of the gaming establishment account including at least the amount of funds transferred from the frequent transaction account, the balance being available for a transaction made against the gaming establishment account.

20 Claims, 6 Drawing Sheets

(56) References Cited

U.S. PATENT DOCUMENTS

| | | | |
|---|---|---|---|
| 2018/0061179 | A1 | 3/2018 | Miri et al. |
| 2019/0102985 | A1 | 4/2019 | Higgins et al. |
| 2019/0188962 | A1 | 6/2019 | Higgins et al. |
| 2019/0354797 | A1 | 11/2019 | Nesta et al. |
| 2019/0362596 | A1 | 11/2019 | Higgins et al. |
| 2021/0104122 | A1 | 4/2021 | Shepherd et al. |
| 2021/0225125 | A1 | 7/2021 | Shepherd et al. |

* cited by examiner

FIG. 6

GAMING ESTABLISHMENT ACCOUNT REFUNDING FOR LACK OF HIGH FREQUENCY TRANSACTIONS

CROSS-REFERENCE TO RELATED APPLICATIONS

This application is related to the following commonly owned co-pending patent applications: U.S. application Ser. No. 18/333,331, entitled "GAMING ESTABLISHMENT ACCOUNT FUNDING HIGH FREQUENCY TRANSACTIONS,"; and U.S. application Ser. No. 18/333,279, entitled "REMOTE GAME SERVER EMPLOYING A GAMING ESTABLISHMENT ACCOUNT THAT FUNDS HIGH FREQUENCY TRANSACTIONS,".

BACKGROUND

In various embodiments, upon an occurrence of a refunding event associated with a period of inactivity of transactions against a frequent transaction account, the systems and methods of the present disclosure transfer of an amount of funds from the frequent transaction account to a gaming establishment account, and display a balance of the gaming establishment account including at least the amount of funds transferred from the frequent transaction account, the balance being available for a transaction made against the gaming establishment account.

Casinos are associated with multiple different channels of commerce including gaming activities (e.g., wagers on plays of games at electronic gaming machines and gaming tables and/or wagers on plays of games via an online casino) and non-gaming activities (e.g., making retail purchases at point-of-sale terminals throughout the casino).

SUMMARY

In certain embodiments, the present disclosure relates to a system including a processor, and a memory device that stores a plurality of instructions. When executed by the processor responsive to an occurrence of a refunding event associated with a period of inactivity of transactions against a frequent transaction account, the instructions cause the processor to cause a transfer of an amount of funds from the frequent transaction account to a gaming establishment account and communicate data that results in a display device displaying a balance of the gaming establishment account. The gaming establishment account includes at least the amount of funds transferred from the frequent transaction account, and the balance is available for a transaction made against the gaming establishment account.

In certain embodiments, the present disclosure relates to a system including a processor, and a memory device that stores a plurality of instructions. When executed by the processor responsive to an occurrence of a refunding event associated with a completion of an online session in which a plurality of wagers were individually transacted against a frequent transaction account, the instructions cause the processor to cause a transfer of an amount of funds from the frequent transaction account to another account, and communicate data that results in a display device displaying a balance of the gaming establishment account including at least the amount of funds transferred from the frequent transaction account.

In certain embodiments, the present disclosure relates to a method of operating a system. Responsive to an occurrence of a refunding event associated with a period of inactivity of transactions against a frequent transaction account, the method includes causing, by a processor, a transfer of an amount of funds from the frequent transaction account to a gaming establishment account, and displaying, by a display device, a balance of the gaming establishment account including at least the amount of funds transferred from the frequent transaction account, the balance being available for a transaction made against the gaming establishment account.

Additional features and advantages are described herein, and will be apparent from the following Detailed Description and the figures.

BRIEF DESCRIPTION OF THE FIGURES

FIG. 6 is a flow chart an example process for operating a system in which a gaming establishment patron management system benefit is earned from online wagering over multiple spaced-apart gaming sessions using funds loaded into a frequent transaction account.

DETAILED DESCRIPTION

Figure 1:
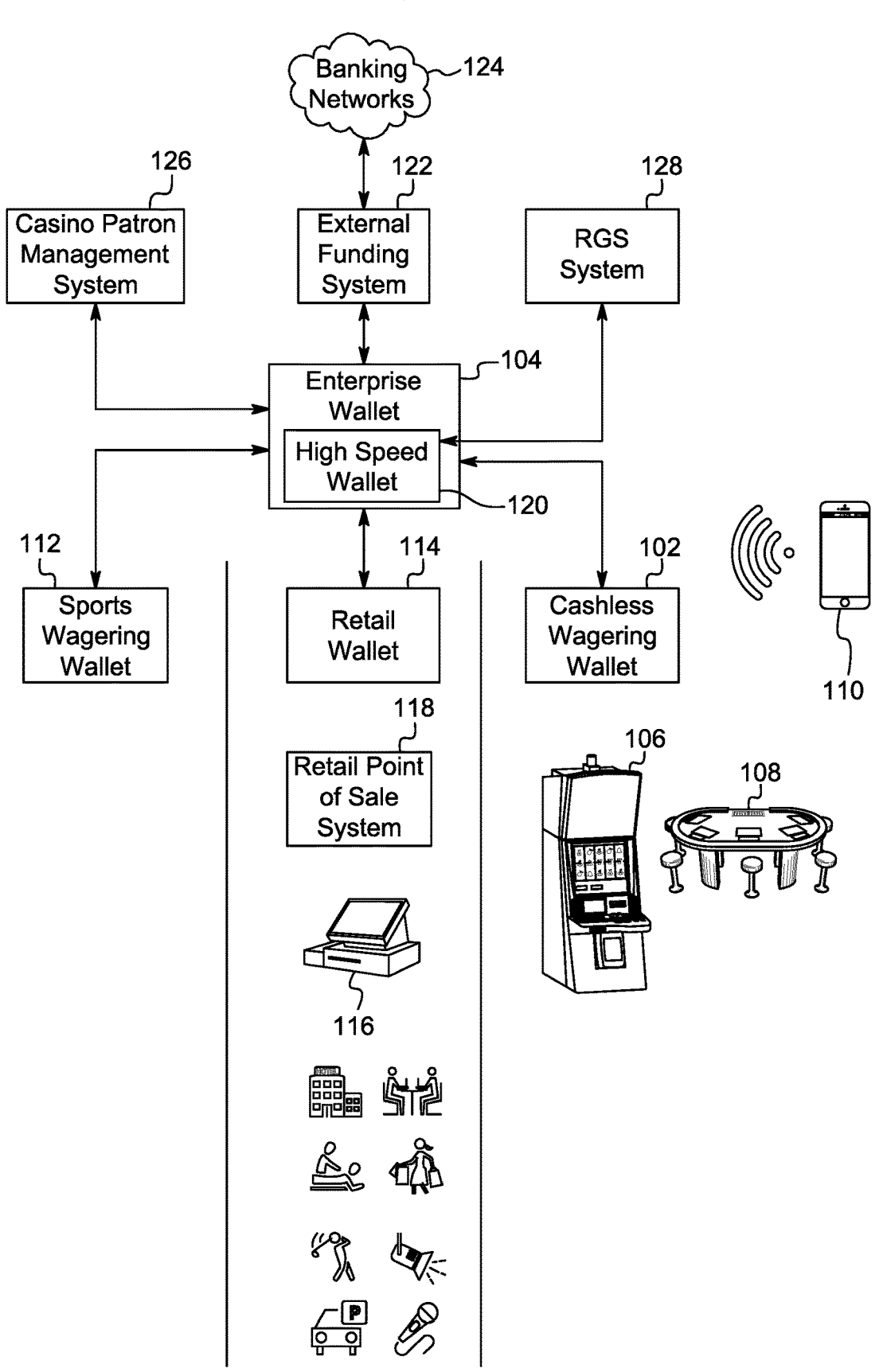
FIG. 1 is an example configuration of the architecture of a plurality of different components of the system disclosed herein.

In various embodiments, upon an occurrence of a refunding event associated with a period of inactivity of transactions against a frequent transaction account, the systems and methods of the present disclosure transfer of an amount of funds from the frequent transaction account to a gaming establishment account, and display a balance of the gaming establishment account including at least the amount of funds transferred from the frequent transaction account, the balance being available for a transaction made against the gaming establishment account.

In certain embodiments, in view of the frequency which certain funding transactions occur may occur and the operational stresses such funding transactions may cause, the systems and methods anticipate certain funding transactions and cause funds to be transferred or otherwise loaded into a dedicated account configured to process transactions at the anticipated frequency. In these embodiments, to account for transactions occurring at different rates in association with different activities undertaken in association with a gaming establishment, the system employs a dedicated gaming establishment account for certain transactions that utilize funds at a relatively high rate. For example, to handle the load introduced by frequent betting by players via online gaming that requires interaction with a gaming establishment account on a per wager basis, the system integrates with a frequent transaction account configured to enable such per wager interactions.

It should be appreciated that the frequent interactions employed by the dedicated gaming establishment account of the present disclosure differ from how certain other gaming establishment accounts operate with transferring funds within certain gaming establishment verticals. For example, in the case of an electronic gaming machine ("EGM"), a player typically transfers an amount of funds from a gaming establishment account, such as a cashless wagering account, to the EGM which then increments a credit meter of the EGM. In this example, the funds from the credit meter of the EGM are then used for each wager placed at the EGM. As a result of this architecture, each individual wager only decrements the local credit meter of the EGM, and therefore each wager placed at the EGM does not impact or otherwise interact with the gaming establishment account, such as the cashless wagering account, on a per wager basis. Without needing to transfer funds to the EGM for each wager placed at the EGM, the cashless wagering account of this example qualifies as an infrequent transaction account (at least based on the frequency of transactions relative to a gaming establishment account that operates to transfer funds for each wager placed).

In another example, in the case of wagering at a gaming table, a player typically transfers an amount of funds from a gaming establishment account, such as a cashless wagering account, to a gaming table component. In this example, a dealer or staff member at the casino cage distributes to the player the appropriate amounts of gaming chips for the funds transferred from their gaming establishment account and the player then uses those chips at the gaming table to play the individual games. As a result of this architecture, each individual wager placed at the gaming table only decrements the amount of gaming chips held by the player and therefore each wager placed at the gaming table does not impact or otherwise interact with the gaming establishment account, such as the cashless wagering account, on a per wager basis. Without needing to transfer funds to the gaming table component for each wager placed at the gaming table, the cashless wagering account of this example qualifies as an infrequent transaction account (at least based on the frequency of transactions relative to a gaming establishment account that operates to transfer funds for each wager placed).

It should be appreciated that while certain systems are configured to handle the operational load of the relatively infrequent transfers between the gaming establishment accounts of these examples and one or more gaming establishment verticals, if such systems were forced to transact against one or more of the gaming establishment accounts of these examples on a per wager basis, the load created on the system would potentially compromise or degrade certain aspects of the system. That is, since the funds transferred from the cashless wagering accounts to the EGM or gaming table component of these examples may first have to be transferred to the cashless wagering account from another gaming establishment account maintained by the system or an external account maintained independent of the system, transacting against the cashless wagering account for each wager placed would potentially exponentially increase the computational load placed on the system. Accordingly, since online gaming (and certain sporting event wagering) operates differently from gaming at an EGM or gaming table and specifically requires transacting against an account for each wager placed, the systems of the present disclosure employ a specifically configured gaming establishment account (i.e., a frequent transaction account) dedicated to handle the load introduced by such frequent transactions.

In operation of certain embodiments, in association with an occurrence of a funding event, the system utilizes the frequent transaction account to accumulate funds from one or more other gaming establishment accounts and escrow such funds prior to use. In these embodiments, given the excessive infrastructure load introduced by high frequency transactions against such other gaming establishment accounts (and the corresponding limits to scalability of the system due to such excessive infrastructure loads), the system employs a frequent transaction account associated with certain attributes to enable high frequency transactions without causing excessive infrastructure loads on the overall system. In other words, to mitigate the load placed upon the other gaming establishment accounts associated with the system, the system automatically bulk-loads funds into the frequent transaction account based upon a funding event, such as a determination that an online gaming session has begin and the current amount of funds in the frequent transaction account is below a threshold amount associated with funding multiple wagers of the online gaming session. Once such funds are bulk-loaded into the frequent transaction account, the individual wagers placed are transacted against the funds in the frequent transaction account. As such, by bulk-loading the frequent transaction account with funds anticipated to be used and then transacting against the frequent transaction account on a per wager basis, the system does not need to transact against other gaming establishment accounts maintained by the system and/or one or more external accounts maintained independent of the system to first transfer funds to the frequent transaction account and then to transact against the individually funded frequent transaction account per wager placed (therefore reducing the load created on the system). Such a configuration of automatically transferring funds from various gaming establishment accounts to a frequent transaction account in anticipation of certain wagering activity additionally reduces the number of account balance queries associated with the system since part or all of an amount of funds projected to be used for the anticipated wagering activity will reside, by design, in the frequent transaction account.

In various embodiments, the present disclosure is directed to a gaming establishment fund management system including various sub-systems that are each associated with or otherwise maintain one or more electronic or virtual accounts. In these embodiments, the various accounts maintained for a user individually or collectively form a resort or enterprise account (i.e., a gaming establishment fund management account) for the user. That is, the collection of gaming establishment accounts, such as cashless wagering accounts (e.g. cashless gaming establishment wagering wallets, cashless sports wagering wallets, and/or cashless mobile wagering wallets), frequent transaction accounts (e.g., a high-speed wallet), and gaming establishment retail accounts (e.g., gaming establishment retail wallets) associated with or otherwise maintained for a user, such as a retail patron, individually or collectively form a resort or enterprise account (i.e., an integrated resort or gaming establishment fund management wallet that offers a consolidated balance of the different gaming establishment accounts) that the user may access to transfer funds and/or view collective and/or individual balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In different embodiments, funds held in zero, one or more of these cashless wagering accounts are accessible in association with (or otherwise configured to be accessible upon one or more inputs from a user and/or gaming establishment personnel) a credit card to cause a transfer of such funds to/from an account associated with the credit card to settle debt incurred using the credit card to make purchases.

In certain embodiments, the gaming establishment fund management system includes a first cashless wagering system that maintains a first cashless wagering account. In these embodiments, a user, such as a player of an EGM utilizes a mobile device application running on a mobile device and/or a physical instrument (e.g., a smart card or a user issued magnetic striped card which the user utilizes via inserting the card into a card reader associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a Cashless Wagering Wallet 102 (e.g., a first cashless wagering account) which is in communication with the enterprise wallet 104. In this example, to facilitate the transfer of funds between this cashless wagering account and a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the enterprise wallet 104. In this example, to facilitate the transfer of funds between this cashless wagering account and a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable, amongst other activities, a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. In different embodiments, funds held in zero, one or more of these gaming establishment retail accounts are accessible in association with (or otherwise configured to be accessible upon one or more inputs from a user and/or gaming establishment personnel) a credit card to cause a transfer of such funds to/from an account associated with the credit card to settle debt incurred using the credit card to make purchases.

In certain embodiments, such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the enterprise wallet 104. In this example, to facilitate the transfer of funds between this gaming establishment retail account and an account associated with a gaming establishment retailer to purchase goods and/or services from the gaming establishment retailer, the system utilizes a retail wallet identity, such as a mobile device 110 running a mobile device application that interfaces with a point-of-sale terminal 116 of a retail point-of-sale system 118 of the gaming establishment retailer and/or a physical instrument (e.g., a smart card or a user issued magnetic striped card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a gaming establishment retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system additionally or alternatively maintains a frequent transaction account. For example, as seen in FIG. 1. the gaming establishment fund management system maintains a High Speed Wallet 120 (e.g., a frequent transaction account) which is in communication with the enterprise wallet 104 and operable to transfer funds to/from one or more other gaming establishment accounts maintained by the gaming establishment fund management system. In certain embodiments, the gaming establishment fund management system is in communication with a frequent transaction account system that maintains a frequent transaction account and to which funds may be transferred to/from one or more gaming establishment accounts maintained by the gaming establishment fund management system. In these embodiments, funds associated with the frequent transaction account are utilized to place one or more wagers (and/or other relatively high frequency transactions) in which each individual wager (and/or other individual transaction) is separately transacted against the frequent transaction account. In certain such embodiments, in addition to the system automatically transferring funds to the frequent transaction account in anticipation of a series of transactions to be made against the frequent transaction account (as described below), the system enables a user to utilize a mobile device application running on a mobile device, a personal gaming device, and/or a physical instrument (e.g., a smart card or a user issued magnetic striped card which the user utilizes via inserting the card into a kiosk) to facilitate the electronic transfer of funds to/from this frequent transaction account. It should be appreciated that while described as the gaming establishment fund management system maintaining the frequent transaction account, in different embodiments, any system or sub-system of the present disclosure can maintain or otherwise be in communication with a separately maintained frequent transaction account.

In certain embodiments, the gaming establishment fund management system that maintains one or more gaming establishment accounts is in communication with an external funding system (i.e., a payment gateway) that is in communication with a network of one or more banks or other financial institutions which operate to electronically transfer funds between the user's accounts maintained at such banks or financial institutions and one or more of the accounts maintained by (or in association with) the gaming establishment fund management system. For example, as seen in FIG. 1, the gaming establishment fund management system that maintains the enterprise wallet 104 is in communication with an external funding system 122 that operates with a network of one or more banks or other financial institutions (i.e., the banking networks 124) to electronically transfer funds from the user's accounts maintained at such banks or financial institutions to one or more of the accounts maintained by the gaming establishment fund management system. In certain embodiments, the gaming establishment fund management system that maintains one or more gaming establishment accounts includes an external funding system that is in communication with a network of one or more banks or other financial institutions which operate to electronically transfer funds between the user's accounts maintained at such banks or financial institutions and one or more of the accounts maintained by (or otherwise associated with) the gaming establishment fund management system. The accounts of these external funding sources include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while described as the gaming establishment fund management system being in communication with the external funding system, in different embodiments, any system or sub-system of the present disclosure can be in communication with one or more external funding system. In different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interact with the external funding system to facilitate the transfer of funds to/from an external account.

In certain embodiments, the gaming establishment fund management system is in communication with one or more gaming establishment patron management systems that monitor activities at various points of contact associated with the gaming establishment and provides rewards, such as redeemable player tracking points, in association with such activities. For example, as seen in FIG. 1, the gaming establishment fund management system that maintains the enterprise wallet 104 is in communication with a gaming establishment patron management system (i.e., the casino patron management system 126) that operates to enhance patrons experiences by offering various comps based on activity undertaken by a patron and/or inactivity of the patron. It should be appreciated that while, in certain embodiments, the gaming establishment fund management system is in communication with one or more gaming establishment patron management systems, in different embodiments, any system or sub-system of the present disclosure can be in communication with one or more gaming establishment patron management systems. In different embodiments, the system utilizes a mobile device running a mobile device application, a kiosk, an interface of a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment patron management system.

In certain embodiments, the gaming establishment fund management system is in communication with a remote game server and/or an online gaming establishment server (not shown) that operate to offer one or more plays of one or more games independent of any gaming establishment device, such as an EGM. In these embodiments, the player employs a game presentation device, such as a personal gaming device (e.g., a mobile device or a personal computer), that operates with a remote game server (and/or the online gaming establishment server) to enable online gaming. For example, as seen in FIG. 1, the gaming establishment fund management system that maintains the enterprise wallet 104 is in communication with a remote game server (i.e., the RGS system 128) that operates with a game presentation device, such as a personal gaming device, to enable, via an internet browser or application of the game presentation device, one or more plays of one or more online games in which each individual wager is separately transacted against the frequent transaction account of the present disclosure. It should be appreciated that while, in certain embodiments, the gaming establishment fund management system is in communication with the remote game server, in different embodiments, any system or sub-system of the present disclosure can be in communication with one or more remote game servers.

In certain embodiments employing a remote game server to facilitate online wagering that utilizes the frequent transaction account to transact against on a per wager basis, the system includes or otherwise operates with one or more remote game servers (and/or one or more online gaming establishment servers) in communication with one or more game presentation devices at one or more locations. In certain instances, each game presentation device is a non-regulatory approved device operable to deliver, via the display of one or more plays of one or more games and in association with a transfer of funds from one or more frequent transaction accounts, one or more game outcomes distributed by the remote game server. In certain embodiments, following the selection of a game to be played and the completion of a transfer of funds from the frequent transaction account to play the selected game, the remote game server (and/or the online gaming establishment server) operates with a game presentation device to cause the display of a game outcome associated with an award by the game presentation device. In these embodiments, since the remote game server determines a game outcome to be presented to the user via the game presentation device, any regulated approved gaming software operates on the remote game server and not on the game presentation device (which operates as a content delivery device that interfaces with users).

It should be appreciated that in certain embodiments, computerized instructions for controlling any games (such as any primary or base games and/or any secondary or bonus games) displayed by the game presentation device are executed by the remote game server. In such "thin client" embodiments, the remote game server remotely controls any games (or other suitable interfaces) displayed by the game presentation device (i.e., the game presentation device operates as the client device) and the game presentation device is utilized to display such games (or suitable interfaces) and to receive one or more inputs or commands, such as through an internet browser of the game presentation device usable to access an internet game page from any location where an internet connection is available. In certain such embodiments, after the game presentation device accesses the internet game page, the remote game server (and/or the online gaming establishment server) identifies a user before enabling that user to place any wagers on any plays of any games. In one example, the remote game server (and/or the online gaming establishment server) identifies the user by requiring a user account of the user to be logged into via an input, at the game presentation device, of a unique username and password combination assigned to the user. The remote game server (and/or the online gaming establishment server) may, however, identify the user in any other suitable manner, such as by validating a player tracking identification number associated with the user; by reading a player tracking card or other smart card inserted into a card reader; by validating a unique user identification number associated with the user by the remote game server (and/or the online gaming establishment server); and/or by identifying the game presentation device, such as by identifying the MAC address or the IP address of the Internet facilitator.

In various embodiments, once the remote game server (and/or the online gaming establishment server) identifies the user, the remote game server (and/or the online gaming establishment server) and the game presentation device interact with each other to enable a gaming service to be provided on the game presentation device. As described below, such a gaming service is funded by an amount of funds bulk-transferred to a frequent transaction account in anticipation of such funds being requested on a per wager basis. In certain embodiments, the game presentation device enables the user to access funds transferred to the frequent transaction account via accessing an application or launching a web browser and logging into a dedicated site for online wagering. After a successful login, the remote game server (and/or an online gaming establishment server) creates a gaming session (or accesses a previously created gaming session) for the game presentation device. For the gaming session, the remote game server (and/or the online gaming establishment server) sends information to the game presentation device that enables an interface to be generated on the game presentation device. In certain embodiments, the user navigates, via the game presentation device, to a link for the gaming service they are interested in utilizing, such as a desired game they wish to play. The game presentation device enables the user to select the link which causes information to be communicated to the remote game server (and/or the online gaming establishment server). This information may include but is not limited to, details about the user as well as security credentials used by the remote game server to validate the request.

After the link is selected, the remote game server (and/or the online gaming establishment server) establishes a connection with the game presentation device. Following this connection, the remote game server (and/or the online gaming establishment server) communicate information to the game presentation device that generates a modification on the game presentation device interface. For example, a new browser window is launched on the game presentation device and the game presentation device is redirected to the remote game server (and/or the online gaming establishment server). In certain instances, the new browser window is customized with graphics, audio, or other media to maintain a consistent audio and visual presentation. In another example, the remote game server (and/or the online gaming establishment server) causes a download of custom or proprietary software application that is compatible with the game presentation device for playing a game employing game outcomes in response to information received from the remote game server. As such, the game presentation device, the remote game server and the online gaming establishment server operate with each other to deploy a customizable gaming interface and a library of games employing game outcomes which are funded, on a per wager basis, using funds bulk-transferred to a frequent transaction account.

In certain embodiments (not shown), the gaming establishment fund management system is in communication with one or more credit systems which each issue the user one or more lines of credit. These lines of credit are accessible to facilitate a transfer of funds from the line of credit issued by the credit system to (either directly or indirectly through a cashless wagering account) a credit balance of a gaming device, such as an EGM and/or a gaming table and/or to (either directly or indirectly through a gaming establishment retail account) a point-of-sale terminal (or an account associated with the point-of-sale terminal). It should be appreciated that the gaming establishment fund management system may be in communication with one or more credit systems, and in different embodiments, any system or sub-system of the present disclosure can be in communication with one or more credit systems. It should be further appreciated that in different embodiments, the system utilizes a mobile device running a mobile device application, a kiosk, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment credit system.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while, in certain embodiments, the gaming establishment fund management system being in communication with one or more credit reporting networks and one or more credit reporting/credit risk systems, in different embodiments, any system or sub-system of the present disclosure can be in communication with one or more credit reporting/credit risk systems.

In certain embodiments, the system utilizes one mobile device application to interact with the different components of the gaming establishment fund management system to, amongst other actions, access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to, amongst other actions, access funds associated with different gaming establishment accounts, the system utilizes a kiosk, a gaming device (e.g., an interface of an EGM or gaming table component), a service window displayed by a gaming establishment device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, a retail point-of-sale terminal, and/or a gaming establishment interface, such as a casino desk, to, amongst other actions, access the funds associated with such gaming establishment accounts. It should be further appreciated that while illustrated in FIG. 1 as using a mobile device running a mobile device application to access funds associated with different gaming establishment accounts (e.g., a cashless wagering account and a gaming establishment retail account) as mentioned above, a physical instrument, such as a smart card or a user issued magnetic striped card may additionally or alternatively be utilized to enable a user access to one or more gaming establishment accounts.

In certain embodiments, the system enables a transfer of funds between different accounts maintained by different components associated with different gaming activities and/or non-gaming activities. In these embodiments, the system employs a service for interfacing with the various components to facilitate balance inquiry and transferring funds amongst the different accounts maintained by these various components. In certain embodiments, such a service collects data from various components and utilizes such collected data to provide a singular view of the balances (or a plurality of singular views of different groupings of balances). In certain embodiments, such a service additionally or alternatively provides facilities to enforce rules associated with the different accounts maintained by the various components. In different such embodiments, these rules include, but are not limited to, jurisdictional controls, self-imposed limits, state governmental controls and federal governmental controls, wherein the system provides the logic to determine how, and how much, to transfer from each account of the various interconnected components to satisfy a request for funds while staying within the confines of such rules. In certain embodiments, such a service additionally or alternatively tracks and coalesces transaction history across the accounts of the interconnected components of the system. In these embodiments, all transactions within the system have a "master" transaction record that ties all of the various fund transfers to a single initiating funds transfer regardless of how many accounts were withdrawn to the satisfy the original request.

In various embodiments, as mentioned above, a plurality of different accounts maintained for or otherwise associated with a user, such as a player, include one or more amounts of funds accessible by the user in response to one or more actions. In these embodiments, while such funds residing in certain gaming establishment accounts provide direct access to such funds when such gaming establishment accounts are transacted against (and further provide resiliency of access to the funds in case of a network outage or other malfunction associated with other accounts), such funds residing in these same gaming establishment accounts represent an increased demand on the network when frequent transactions are needed against the same account, such as on a per wager basis (due to a transaction multiplier effected required by the system initiating a balance or transfer transaction having to reach out to each account for balance inquiry or a funds transfer from a different accounts). For example, while funds residing in a cashless wagering account provide relatively quick and direct access to such funds during a gaming session at an EGM (such that a player or user may relatively quickly and easily transfer funds back and forth from the cashless wagering account and the credit balance of the EGM with the credit balance of the EGM being used to transact against for wagering activity), transacting against funds residing in the cashless wagering account for each wagering transaction occurring in an online gaming environment and/or high frequency sporting event wagering environment increases the level of stress on the system via at least increasing the amount of fund data communicated between system components which in turn reduces the speed of the system. Accordingly, the system of the present disclosure employs a frequent transaction account to transact directly against for frequent wagering activity thereby mitigating the level of stress on the system via reducing any increase in the amount of fund data communicated between system components.

In certain embodiments, in view of the computing stresses placed on the system by frequent transactions against certain individual accounts, the system employs a frequent transaction account and, in certain instances, transfers funds to the frequent transaction account prior to such funds being requested. Such a frequent transaction account is associated with certain attributes (e.g., employing one or more limits and/or anti-money laundering safeguards) and/or certain triggers (e.g., an online gaming session initiation indicator that causes a funding event to occur and/or an online gaming session termination indicator that causes a defunding event to occur) that differ from other gaming establishment accounts that are not designed to facilitate relatively frequent transfers of funds into and out from such other gaming establishment accounts.

More specifically, in operation of certain embodiments, the system determines if a funding event occurs in association with the frequent transaction account and if so, the system bulk loads an amount of funds in the frequent transaction account (or bulk reloads an amount of funds in the frequent transaction account). Such a bulk loading of funds to the frequent transaction account occurs prior to and in anticipation of such funds being individually requested to be transacted against. For example, following an initiation of an online gaming session and upon a request of a $5 wager to be placed on an online game offered in association with a remote game server, rather than transferring $5 from a cashless wagering account to fund the requested wager, the system causes $100 to be transferred from the cashless wagering account to the frequent transaction account. In this example, such a transfer of $100 occurs in anticipation of multiple online wagers being placed in association with the online gaming session. Such a configuration ensures that the frequent transaction account has adequate funds to be transacted against at an elevated frequency (relative to the frequency which other gaming establishment accounts are transacted against) without needing to stress the system by repeatedly making multiple transfers (potentially from multiple accounts) to individually fund such wagering activity.

In certain embodiments, the system determines, at designated intervals, whether a funding event occurs in association with a frequent transaction account. For example, the system employs a suitable sampling rate, such as a sampling rate based on time elapsed, transactions occurring in association with that frequent transaction account or one or more other factors, wherein at each sampling rate interval, the system determines whether a funding event occurred in association with that frequent transaction account. In one such embodiment, a funding event occurs by the system extrapolating previous wagering activities into the future and determining when to re-load the frequent transaction account. For example, the system determines that a player is wagering at a pace of $10 per minute, and will generate an occurrence of a funding event one minute prior to the expected exhaustion of the balance of the frequent transaction account.

In certain embodiments, a funding event occurs in association with a frequent transaction account when one or more transactions are requested against that frequent transaction account. In these embodiments, for one or more frequent transaction accounts, as part of the determination of whether or not a funding event occurs, the system determines whether that frequent transaction account is being attempted to be actively transacted against (or was actively transacted against within a designated period of time). A frequent transaction account is transacted against if that frequent transaction account has been involved in any transaction (e.g., fund transfer) or attempted transaction (e.g., attempted fund transfer) within a designated period of time. For example, a frequent transaction account is considered transacted against if any one or more of: (i) any amount of funds has been transferred to that frequent transaction account from another account within a designated period of time, (ii) any amount of funds has been deposited in that frequent transaction account within the designated period of time, and/or (iii) any amount of funds has been transferred out of that frequent transaction account to fund wagering activity (or other activities) within the designated period of time.

In certain embodiments, a funding event occurs in association with a frequent transaction account when a balance of that frequent transaction account reaches zero. That is, for zero, one or more frequent transaction accounts, the system determines whether that frequent transaction account currently includes no amount of funds (i.e., a zero balance) and utilizes that data to determine whether or not a funding event occurs. In certain embodiments, a funding event occurs in association with a frequent transaction account when a balance of that frequent transaction account is greater than zero, but less than a threshold amount of funds. That is, for zero, one or more frequent transaction accounts, as part of the determination of whether or not a funding event occurs, the system determines whether that frequent transaction account currently includes an amount of funds that is less than a designated or threshold minimum amount of funds associated with that account. It should be appreciated that in these embodiments, the funding event may or may not occur based on the relative amount of the frequent transaction account and one or more other events that may or may not occur, such as whether or not the frequent transaction account has been attempted to be transacted against within a period of time.

In certain embodiments, different accounts are associated with the same threshold amount of funds. In certain embodiments, different accounts are associated with different threshold amounts of funds. In such embodiments, any suitable factor, such as type of account, historical account balances and historical account activity, may determine the threshold amount of funds for such accounts. In certain embodiments, different players are associated with the same threshold amount of funds for one or more accounts maintained for those players. In certain embodiments, different players are associated with different threshold amounts of funds for one or more accounts maintained for those players. In such embodiments, any suitable factor, such as the player's wagering history or the player's player tracking status (as obtained via the gaming establishment patron management system) may factor into the threshold amount of funds for one or more accounts maintained for that player.

In certain embodiments, a funding event occurs in association with data communicated to and/or from a component of another system or sub-system. In these embodiments, upon the component of the other system communicating data to the system that a player's engagement with that other system has begun, the system causes a funding event to occur in association with one or more frequent transaction accounts. For example, when an online gaming system notifies the gaming establishment fund management system that a player has initiated an online gaming session associated with a remote game server and/or an online gaming establishment server, the gaming establishment fund management system causes a funding event to occur and an amount of funds to be transferred to one or more frequent transaction accounts. In another example, when a sporting event wagering system notifies the gaming establishment fund management system that a player that historically places multiple in-game wagers on a sporting event has logged into an EGM and requested a sporting event be displayed, the gaming establishment fund management system causes a funding event to occur and an amount of funds to be transferred to one or more frequent transaction accounts.

In various embodiments, if a funding event does not occur in association with a frequent transaction account, the system continues determining, at designated intervals, whether or not a funding event occurs in association with that frequent transaction account. Put differently, upon the system determining that a series of one or more anticipated transactions are not immediately expected to be requested against an account (i.e., the account is not expected to be actively used within a designated time period) and/or a balance of that account is within an acceptable range of values, the system keeps the funds in their respective accounts and does not initiate any transfer of funds to the frequent transaction account.

On the other hand, if a funding event occurs in association with a frequent transaction account, the system determines an amount of funds to automatically transfer to the frequent transaction account. In these embodiments, in anticipation of multiple transactions being made against the frequent transaction account and in an effort to reduce the need to complete an individual transfer of funds to the frequent transaction account for each transaction, the system determines an amount of funds to automatically load into the frequent transaction account that accounts for such an anticipated batch of transactions. For example, since each online wager placed is individually transacted against the frequent transaction account (and not against any local credit balance of the game presentation device interfacing with the online wagering system), the system anticipates multiple online wagers being placed for an online gaming session and determines an amount of funds that accounts for such anticipated multiple online wagers. In another example, since each in-game sporting event wager placed via a personal gaming device is individually transacted against the frequent transaction account (and not against any local credit balance of the personal gaming device interfacing with the sporting event wagering system), the system anticipates multiple in-game sporting event wagers being placed for a sporting event and determines an amount of funds that accounts for such anticipated grouping of in-game sporting event wagers.

In certain embodiments, the system automatically transfers the entire amount of funds from one or more other gaming establishment accounts to the frequent transaction account. In certain embodiments, the system automatically transfers less than the entire amount of funds from one or more other gaming establishment accounts to the frequent transaction account. In one such embodiment, the system tracks, in real-time, the draw-down rate of funds associated with the player (and/or associated with the frequent transaction account) and dynamically determines an amount of funds to transfer to the frequent transaction account based on a targeted occurrence of funding events per second/per minute metric. In another such embodiment wherein a funding event occurs in association with a balance of a frequent transaction account falling below a threshold amount of funds, the system automatically transfers an amount from one or more other gaming establishment accounts to bring the frequent transaction account to at least the threshold amount of funds.

In another embodiment, the system automatically transfers a pre-configured amount from one or more other accounts, such as other gaming establishment accounts and/or external accounts to the frequent transaction account. In different embodiments, this pre-configured amount is determined on a per account basis, for all accounts or based upon account tier, rank, and/or certain player identifying criteria. In such embodiments, any suitable factor, such as the player's wagering history or the player's player tracking status (as obtained via the gaming establishment patron management system) may factor into the pre-configured amount to transfer to the frequent transaction account. For example, the system tracks a player's previous wagers and win/loss and determines an amount to transfer to the frequent transaction account to try to ensure that fund transfers only occur at spaced-apart intervals that do not stress the system, such as every 5 minutes, or every 10 minutes. In this example, this amount is determined based on reviewing one or more of a player's historic activity on player session start, the player's first funding or wagering transaction in the past 24 hours, and/or historical fund draw down rates. It should be appreciated that in certain instances, one or more other gaming establishment accounts and/or external accounts may not include enough funds for the pre-configured amount to be bulked transferred to the frequent transaction account. In certain such instances, the system proceeds to automatically transfer all remaining funds in the other gaming establishment account(s) and/or external account(s) to the frequent transaction account.

In these embodiments, following the determination to automatically transfer an amount of funds to a frequent transaction account from one or more other gaming establishment accounts, the system which maintains the other gaming establishment accounts, such as a cashless wagering system which maintains a cashless wagering account, updates a balance of the other gaming establishment account (to reflect a reduction of the amount of funds to be transferred) and communicates an authorization to the gaming establishment fund management system which maintains the frequent transaction account. The gaming establishment fund management system then increases a balance of available funds of the frequent transaction account by the transferred amount of funds. Once transferred, the system enables multiple transactions to occur against the frequent transaction account without needing to transfer additional funds to the frequent transaction account. As such, the automatic transfer of an amount of funds anticipated to be used to a frequent transaction account reduces the number of account balance queries and transfers associated with the system since most, if not all, funds anticipated to be used will reside, by design and for the anticipated period of expected use, in the frequent transaction account.

Figure 2:
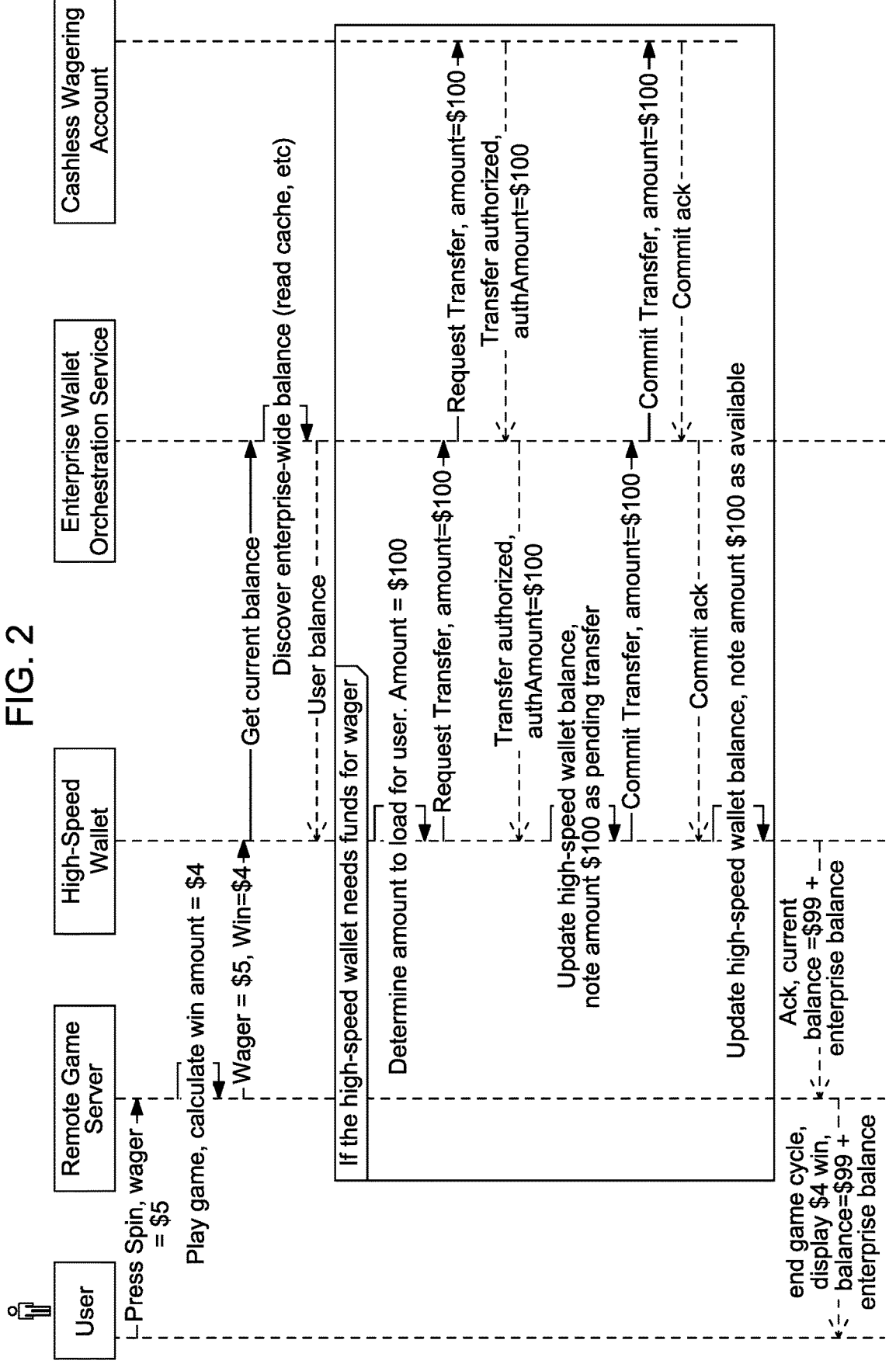
FIG. 2 is a flow chart an example process for operating a system in which an occurrence of a funding event based on a placement of an online wager results in an amount of funds associated with multiple online wagers being loaded into a frequent transaction account.
Figure 3:
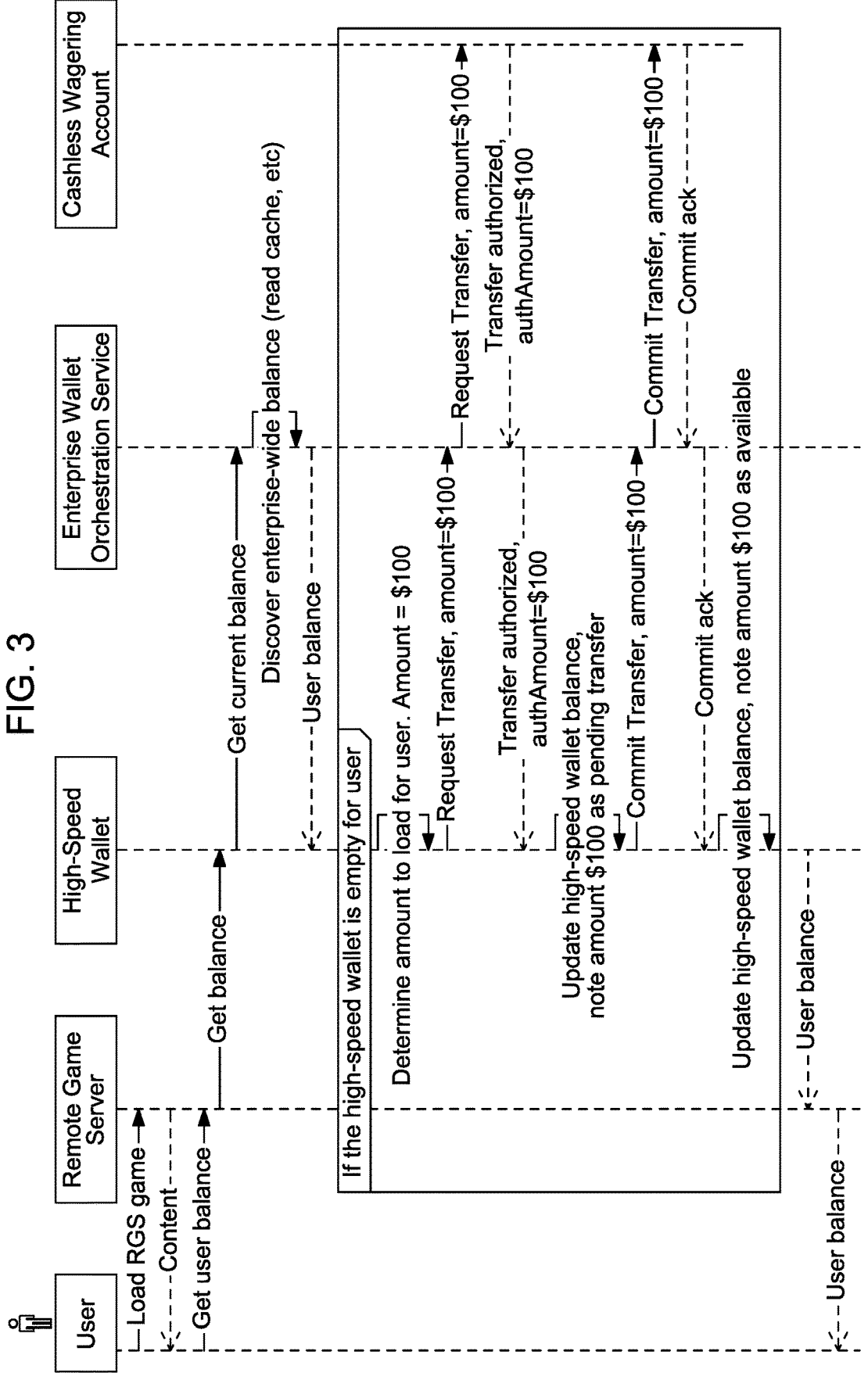
FIG. 3 is a flow chart an example process for operating a system in which an occurrence of a funding event based on a request from a remote game server results in an amount of funds being loaded into a frequent transaction account.

Accordingly, in various embodiments, the system of the present disclosure enables an automatic bulk transfer of an amount of funds from one or more gaming establishment accounts and/or external accounts to a frequent transaction account in anticipation of multiple transactions expected to occur against the frequent transaction account, thereby saving the user time (by not having to manually request each transfer to fund each transaction) and the system resources via the elimination of certain fund transfers. For example, as seen in FIG. 2 (which illustrates the described interactions between the user, the remote game server operating in an online wagering environment, a frequent transaction account, a cashless wagering account and a gaming establishment fund management system orchestration service), when the funding event is triggered upon the player's first request for an online wager, certain embodiments of the present disclosure enable a bulk transfer of funds from a cashless wagering account to a frequent transaction account (i.e., a high-speed wallet) in anticipation of fund usage that has not yet been requested. In another example, as seen in FIG. 3 (which illustrates the described interactions between the user, the remote game server operating in an online wagering environment, a frequent transaction account, a cashless wagering account and a gaming establishment fund management system orchestration service), when the funding event is triggered by a balance request from the remote game server, certain embodiments of the present disclosure enable a bulk transfer of funds from a cashless wagering account to a frequent transaction account (i.e., a high-speed wallet) in anticipation of fund usage that has not yet been requested. Such a configuration of these examples thus eliminates the unnecessary stresses on the system that otherwise would occur if a series of individual transfers (and potentially consolidations of funds to even enable such individual transfers) were to take place based on actual funding requests.

In certain embodiments, the system associates zero, one or more controls or restrictions, such as use limits, with a frequent transaction account. In these embodiments, prior to automatically bulk transferring any amount of funds to the frequent transaction account in anticipation of use of such funds transacted against the frequent transaction account, the system determines whether or not such controls or restrictions are satisfied as part of the bulk transfer. In certain of these embodiments, if such conditions are satisfied, the gaming establishment fund management system invokes one or more security measures. In certain other of these embodiments, if such conditions are satisfied, the gaming establishment fund management system denies the bulk transfer of funds to the frequent transaction account. As such, to balance the need to prevent potential unauthorized access to the funds associated with the user's gaming establishment fund management account (and other money-laundering concerns) against the need to provide a relatively frictionless experience for users, the gaming establishment fund management system dynamically employs one or more controls, such as usage controls, such that certain transactions trigger the need to potentially employ enhanced security measures and certain transactions do not trigger the need to potentially employ enhanced security measures.

In certain embodiments, such controls or restrictions include certain jurisdictional loss-limits that players have to adhere to, or alternatively that the system is required to offer to the player. In certain such embodiments, these loss-limits apply to multiple gaming verticals (e.g., a player creates a $100 per day loss limit and the system must apply that daily loss limit to activity at EGMs, gaming tables, and for online wagering games). In these embodiments in which loss-limits are multi-channel and apply to all (or some sub-set of) player activity across online and land-based gaming, the player's current loss-limit status needs to be shared across the various touchpoints of the system. In one embodiment, data associated with every wager placed on every gaming vertical is communicated to a back-end component which determines whether to prevent future wagering (during an applicable period) based on whether the loss-limit is reached. In another embodiment, different components of the system periodically share updated loss-limit information across the components of the system and warn the player when one or more wagers would cause the player's wagering activity for the period to exceed the loss-limit.

In certain embodiments, loss-limits are evaluated when fund transfers occur between the various components of the system of the present disclosure. For example, the component that maintains the frequent transaction account learns about the player's existing losses for the current period from the rest of components of the system when funds are initially transferred into the frequent transaction account (during the transaction associated with a funding event). In this example, the component that maintains the frequent transaction account then notifies one or more other components of the system about the amount of losses experienced online during the period responsive to subsequently occurring funding events and/or when the player's online session has ended and a refunding event occurs.

In certain embodiments, loss-limits apply to online gaming only. In these embodiments, to support enforcement of online-only loss-limits, the system that maintains the frequent transaction account needs to know the applicable loss-limit (either a jurisdictional configured loss-limit or a player configured loss-limit set directly by the player via a user interface which communicates the setting to the system that maintains the frequent transaction account). Once the system is aware of the applicable loss-limit, the system enforces the limit on the configured period of time for online gaming transactions.

In one embodiment, enforcing the applicable loss-limit includes denying future wagers from being placed online if the loss-limit is reached. For example, if the player has a $100 online gaming hard loss-limit per day, then the system tracks the player's losses for the current period and denies wagering transactions when the player's next attempted wager will push them over the configured loss-limit for the period. In another embodiment, rather than utilizing a hard loss-limit that prevents wagering when reached, the system utilizes a soft loss-limit that warns the player when one or more wagers would cause the player's wagering activity for the period to exceed the loss-limit. In one such embodiment, a soft limit being hit triggers the system to publish a "limit exceeded" event, which can be consumed by the online gaming establishment server, the remote game server, or other player facing applications of the gaming establishment infrastructure, which notify the player of the event (via a web-site, an in-application notification, an e-mail, and/or a SMS text). In another such embodiment, a soft limit is implemented in which the system notifies the remote game server (and/or the online gaming establishment server) of the player's current balance and amount over their loss limit (or amount of loss-limit remaining). In this embodiment, the remote game server (and/or the online gaming establishment server) determines when the player has exceeded the loss-limit, and the remote game server (and/or the online gaming establishment server) notifies the player via an appropriate user interface.

In certain embodiments, the system enables an operator, such as a gaming establishment operator, to determine and activate zero, one or more controls as well as zero, one or more security measures to employ. In certain embodiments, the determination to associate one or more controls and/or security measures is based on one or more inputs from an operator. In certain embodiments, the system enables one or more systems or sub-systems, such as the online wagering system, to determine and activate one or more controls and/or security measures. In certain of these embodiments, the determination to associate one or more controls and/or security measures is based on one or more inputs from personnel associated with such systems or sub-systems. In certain embodiments, the system enables the user to determine and activate zero, one or more controls as well as zero, one or more security measures to employ. In certain embodiments, the determination to associate one or more controls and/or security measures is based on one or more inputs from the user.

In certain embodiments, the controls are associated with an identity of a user. In certain such embodiments, one or more activities of the identified user may factor into the employment (or lack thereof) of controls. In certain embodiments, the controls are associated with a quantity and/or an amount of transactions over a given period of time (e.g., hourly, daily, weekly, monthly). In certain embodiments, the controls are additionally or alternatively associated with the amount of a transfer and/or transaction. In certain embodiments, the system employs the same controls and/or security measures for each user. In certain embodiments, the system employs different controls and/or security measures for different users. In certain of these embodiments, the system utilizes historical data regarding the user and past transactions in determining one or more aspects of one or more controls and/or security measures to associate with that user. In certain of these embodiments, the system utilizes one or more attributes of the user, such as a player tracking account status of the user, in determining one or more aspects of one or more controls and/or security measures to associate with that user. It should be appreciated that in certain embodiments, one or more of the controls may be overridden and/or adjusted by qualifying personnel. In these embodiments, the gaming establishment fund management system associates different levels of overriding and/or adjusting of controls with different qualifying personnel. In these embodiments, the gaming establishment fund management system enables different levels of overriding and/or adjusting of controls for different users based on one or more attributes, such as status or historical spend, of such users.

In certain embodiments, in addition to automatically transferring a bulk amount of funds associated with anticipated use to a frequent transaction account to combat operational stresses placed on the system if multiple individual transfers of such funds occurred, upon an occurrence of a refunding event, the system operates to automatically transfer part or all of the funds from the frequent transaction account to one or more gaming establishment accounts and/or external accounts.

In certain embodiments, the system determines, at designated intervals, whether a refunding event occurs in association with a frequent transaction account. In certain embodiments, a refunding event occurs in association with a frequent transaction account when one or more transactions are not requested against that frequent transaction account for a designated period of time. In these embodiments, for one or more frequent transaction accounts, as part of the determination of whether or not a refunding event occurs, the system determines whether that frequent transaction account is being attempted to be actively transacted against (or was actively transacted against within a designated period of time).

In certain embodiments, a refunding event occurs in association with data communicated to and/or from a component of another system or sub-system. In these embodiments, upon the component of the other system communicating data to the system that a player's engagement with that other system has completed, the system causes a refunding event to occur in association with one or more frequent transaction accounts. For example, when an online gaming system notifies the gaming establishment fund management system that a player has logged out from or otherwise completed an online gaming session, the gaming establishment fund management system causes a refunding event to occur and part or all of an amount of funds associated with a frequent transaction account to be transferred to one or more other accounts, such as a cashless wagering account and/or an external account. In another example, when a sporting event wagering system notifies the gaming establishment fund management system that a sporting event which a player has been placing multiple in-game wagers on is complete, the gaming establishment fund management system causes a refunding event to occur and part or all of an amount of funds associated with a frequent transaction account to be transferred to one or more other accounts, such as a cashless wagering account and/or an external account.

In various embodiments, if a refunding event does not occur in association with a frequent transaction account, the system continues maintaining an amount of funds in the frequent transaction account for anticipated future usage. Put differently, upon the system determining that frequent transactions remain immediately expected to be requested against an account (i.e., the account is expected to be actively used within a designated time period), the system keeps the funds in the frequent transaction account. On the other hand, if a refunding event occurs in association with a frequent transaction account, the system determines an amount of funds to transfer from the frequent transaction account. In these embodiments, to enable funds bulk transferred to the frequent transaction account to be available for other transactions, the system determines an amount of funds to transfer away from the frequent transaction account.

In certain embodiments, the system transfers the entire amount of funds from the frequent transaction account to one or more gaming establishment accounts and/or external accounts. In certain embodiments, the system transfers less than the entire amount of funds from the frequent transaction account to one or more gaming establishment accounts and/or external accounts. In another embodiment, the system transfers a pre-configured amount from the frequent transaction account to one or more gaming establishment accounts and/or external accounts. In different embodiments, this pre-configured amount is determined on a per account basis, for all accounts or based upon account tier, rank, and/or certain player identifying criteria. In such embodiments, any suitable factor, such as the player's wagering history or the player's player tracking status (as obtained via the gaming establishment patron management system) may factor into the pre-configured amount to transfer from the frequent transaction account.

In these embodiments, following the determination to transfer an amount of funds from a frequent transaction account to one or more gaming establishment accounts, the system which maintains the frequent transaction account updates a balance of the frequent transaction account (to reflect a reduction of the amount of funds to be transferred) and communicates an authorization to the gaming establishment fund management system which maintains the destination account, such as a cashless wagering account. The gaming establishment fund management system then increases a balance of available funds of the destination account by the transferred amount of funds.

Figure 4:
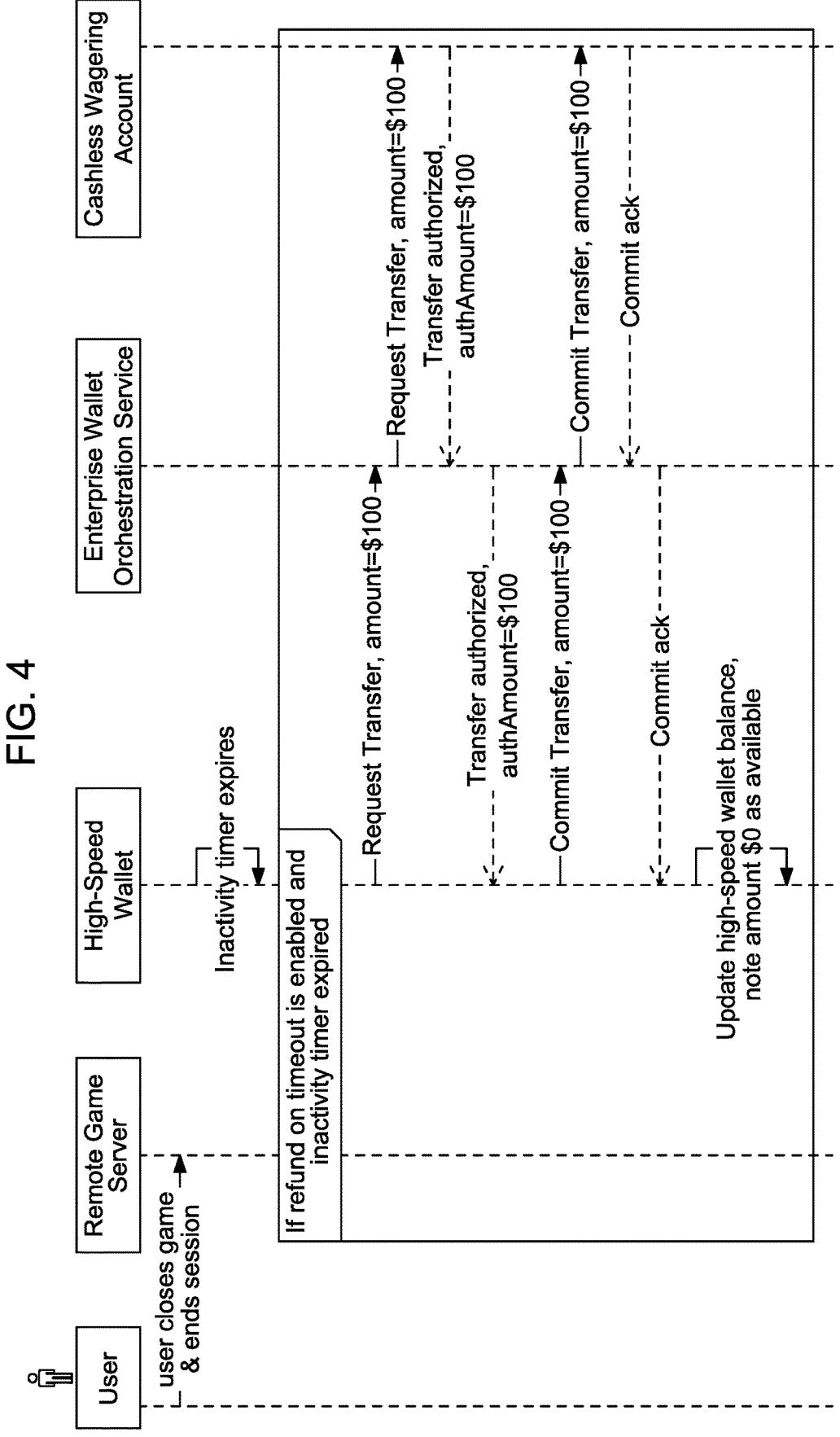
FIG. 4 is a flow chart an example process for operating a system in which an occurrence of a refunding event based on a period of inactivity of online wagering results in an amount of funds being transferred from a frequent transaction account.

Accordingly, in various embodiments, the system of the present disclosure enables a transfer (including an automatic transfer based on an occurrence of a refunding event) of an amount of funds from a frequent transaction account to one or more gaming establishment accounts (and/or external accounts) to reduce the player liability held in the frequent transaction account at any given time. Such a configuration also reduces real-time transaction load so that frequent transaction account system resources can be more dedicated to handling online gaming transactions (and not having to also handle funding transactions for other player activities at various gaming establishment verticals, such as funding transactions in association with EGMs, gaming tables, gaming establishment retail locations and/or hotel spend). For example, as seen in FIG. 4 (which illustrates the described interactions between the user, the remote game server operating in an online wagering environment, a frequent transaction account, a cashless wagering account and a gaming establishment fund management system orchestration service), when a refunding event is triggered, certain embodiments of the present disclosure enable a transfer of funds to a cashless wagering account from a frequent transaction account (i.e., a high-speed wallet) if anticipated fund usage is no longer expected against the frequent transaction account.

In certain embodiments, in addition to employing a frequent transaction account to transact against for frequent transactions that otherwise would unnecessarily stress the system, the system integrates the frequent transaction account with the gaming establishment patron management system. In these embodiments, such integration enables the gaming establishment patron management system to track online wagering activity and award players with loyalty credits or currency as a result of their online wagers.

In one embodiment, the system that maintains the frequent transaction account tracks batches of online wagers placed and communicates data associated with the tracked batches to the gaming establishment patron management system upon a reporting event. In different embodiments, such a reporting event occurs at the end of the online wagering session (i.e., upon a communication of an end of session indicator), based on a number of games played and/or based on an amount of time of the online wagering session.

In another embodiment, the system that maintains the frequent transaction account tracks online wagers placed in real-time and communicates that wagering activity directly to the gaming establishment patron management system to calculate an appropriate award for that wagering activity. In another embodiment, the system that maintains the frequent transaction account becomes aware of the wagering activity and win in the same transaction, calculates a hold for the game cycle, and awards player points appropriate for the hold associated with that individual wagering transaction. For example, if a player wagers $10, and wins $9, then the system that maintains the frequent transaction account determines a hold of $1 ($10-$9) and calculates a loyalty award (or operates with the gaming establishment patron management system to calculate a loyalty award) as a percentage of the calculated hold (e.g., player tracking points equal to 20% of the calculated hold for every game cycle).

Figure 5:
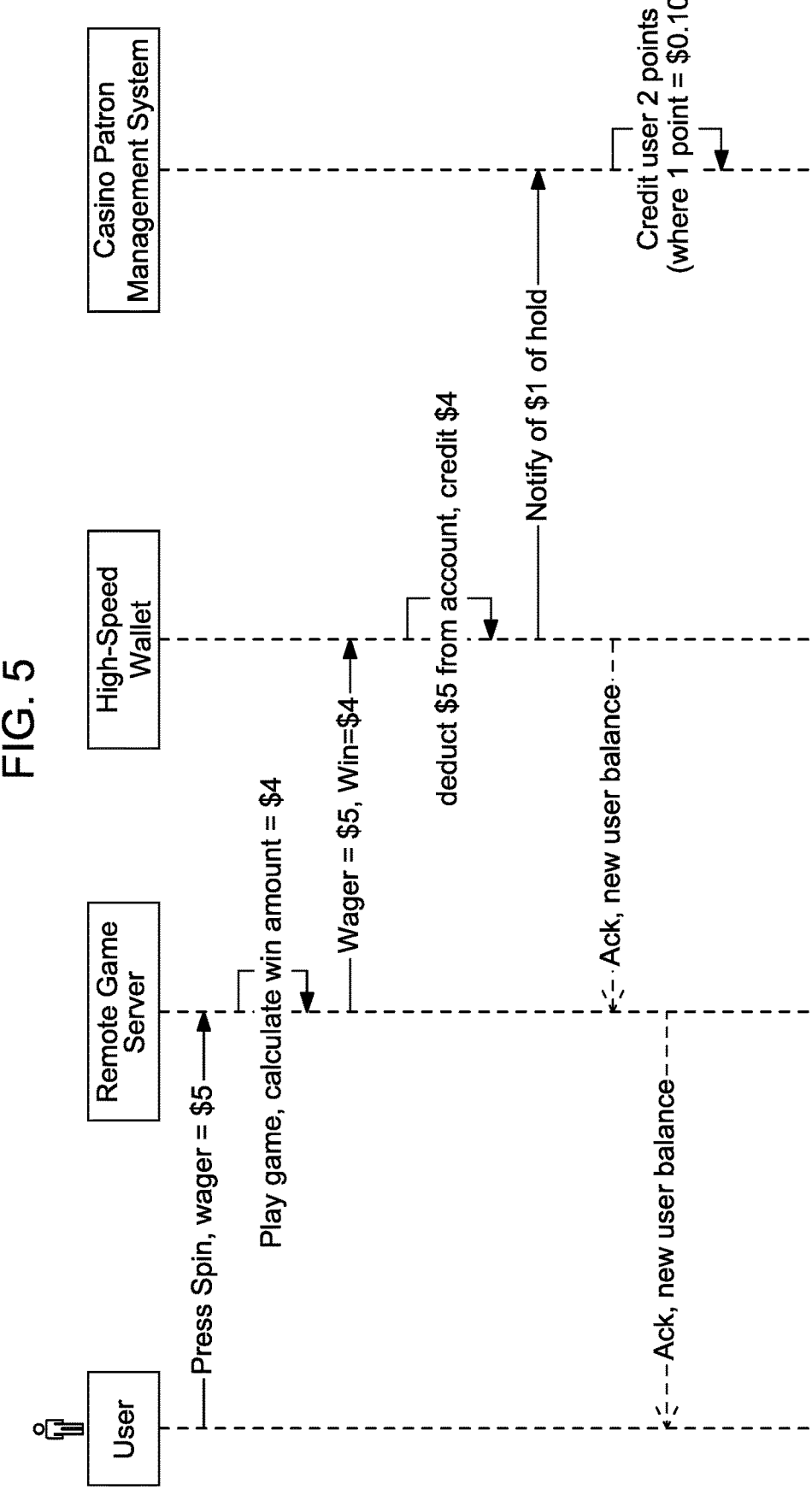
FIG. 5 is a flow chart an example process for operating a system in which a gaming establishment patron management system benefit is earned from online wagering using funds loaded into a frequent transaction account.

Accordingly, in various embodiments, the system of the present disclosure operates with a gaming establishment patron management system to reward players loyalty awards based on the online wagering activity the player has undertaken using funds transacted against a frequent transaction account. For example, as seen in FIG. 5 (which illustrates the described interactions between the user, the remote game server operating in an online wagering environment, a frequent transaction account, and a gaming establishment patron management system), certain embodiments of the present disclosure enable a component that maintains a frequent transaction account (i.e., a high-speed wallet) to determine a hold for each online game played and report that hold to a gaming establishment patron management system (i.e., a casino patron management system) to provide a player one or more loyalty awards for such online wagering activity.

In certain embodiments, in addition to providing a player one or more loyalty awards for online wagering activity tracked in association with transactions made against a frequent transaction account, the system awards the player a loyalty award for returning and making online wagers within a configurable period of time. In these embodiments, the system that maintains the frequent transaction account and/or the gaming establishment patron management system track online wagering activity employing the frequent transaction account over multiple sessions and offer one or more loyalty awards based on the frequency of such sessions. In one such embodiment, the the system that maintains the frequent transaction account maintains one or more loyalty reward rules and provides the player such loyalty awards. In another such embodiment, the system that maintains the frequent transaction account notifies the gaming establishment patron management system of certain player activity, and the gaming establishment patron management system (or other external loyalty rewards system) determines the player reward and credits the player's applicable account accordingly. For example, if a player returns to wager online using the frequent transaction account within a certain period of time following the completion of an online wagering session also using the frequent transaction account, the system determines that the player earns a point multiplier (and/or free play or promotional credits to fund wagering activity) for the return wagering session.

Figure 6:
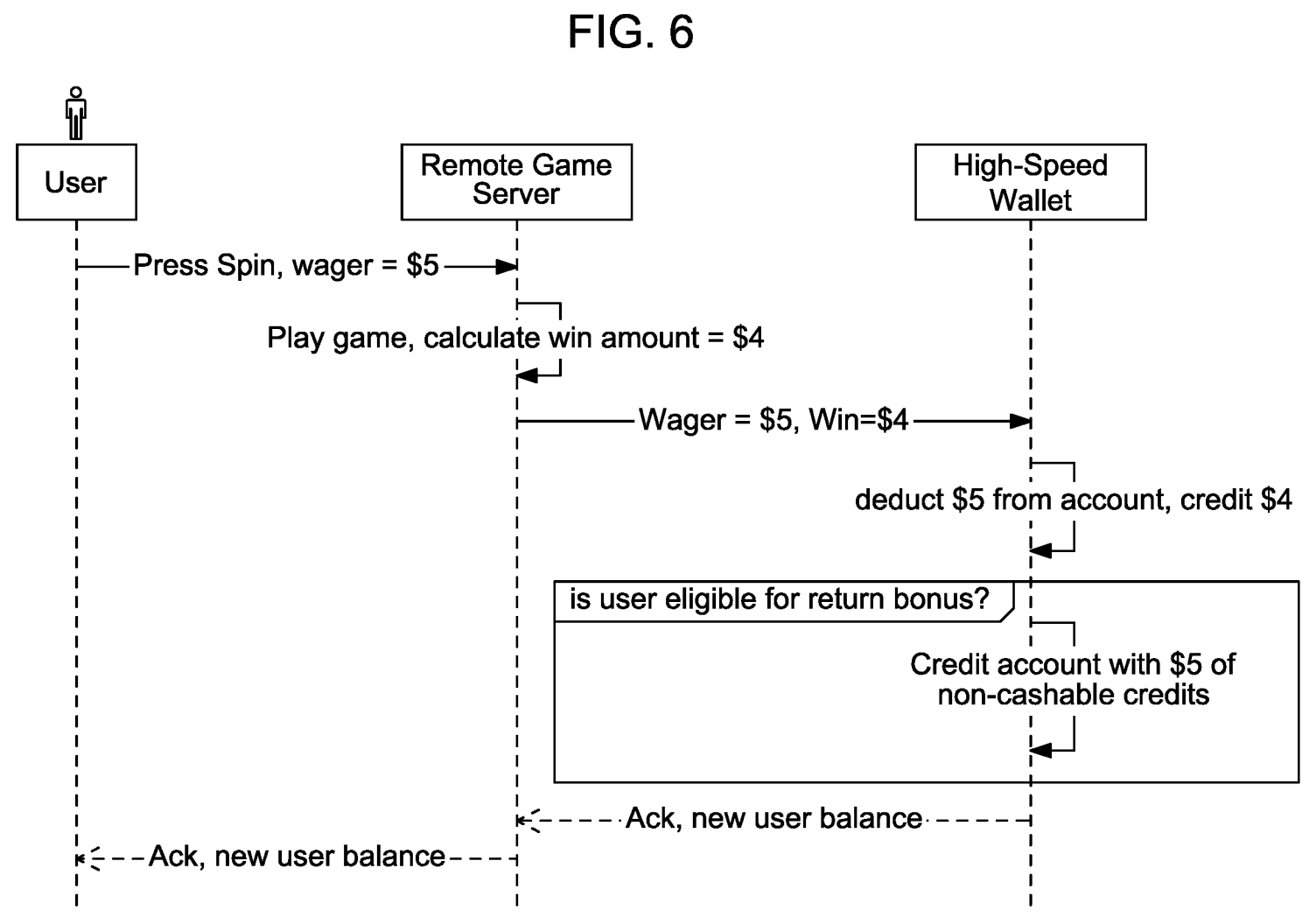

Accordingly, in various embodiments, the system of the present disclosure operates with a gaming establishment patron management system to reward players loyalty awards based on multiple sessions of online wagering activity the player has undertaken using funds transacted against a frequent transaction account. For example, as seen in FIG. 6 (which illustrates the described interactions between the user, the remote game server operating in an online wagering environment, and a frequent transaction account), certain embodiments of the present disclosure enable a component that maintains a frequent transaction account (i.e., a high-speed wallet) to track online wagering activity across multiple sessions and provide a player one or more loyalty awards for such repeated online wagering activity.

As such, in addition to employing a dedicated account to offer player tracking benefits in association with online wagering, the system of the present disclosure employs a frequent transaction account to transact directly against for frequent wagering activity thereby mitigating the level of stress on the system via reducing any increase in the amount of fund data communicated between system components. Put differently, in view of the computing stresses associated with frequent transactions against certain individual accounts, the system employs a frequent transaction and, in certain instances based on the occurrence of certain triggers associated with the frequent transaction account, transfers more funds than actually requested to the frequent transaction account prior to such an excess amount of funds being requested. Such a configuration of bulk-loading a frequent transaction account ensures that the frequent transaction account has adequate funds to be transacted against at an elevated frequency (relative to the frequency which other gaming establishment accounts are transacted against) without needing to stress the system by repeatedly making multiple transfers (potentially from multiple accounts) to individually fund such wagering activity.

In various embodiments, prior to using funds in an account, such as using funds in a frequent transaction account to fund online wagering activity, the system enables one or more gaming establishment accounts (which funds may be transferred to the frequent transaction account from) to be funded from one or more sources. In certain embodiments, the system enables the gaming establishment account to be directly funded from one or more of such sources. In certain embodiments, the system enables the gaming establishment account to be indirectly funded from one or more of such sources, such as by an amount of funds from such sources first being transferred to another gaming establishment account and then such an amount of funds being transferred from the other gaming establishment account to the gaming establishment account.

In certain embodiments, the gaming establishment account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment account is associated with a gaming establishment or a group of gaming establishments, wherein the user establishes a gaming establishment account by a deposit of funds (such as at a kiosk) to be subsequently utilized in association with the mobile device application. In other embodiments, the gaming establishment account is funded via a mobile device electronic fund transfer, such using Apple Pay™ or Android Pay™. It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facilitate the transfer of funds from a third-party account. In certain embodiments, the system enables funds to be deposited in a gaming establishment account via activating a line of credit associated with the user.

In certain embodiments, the system enables funds to be deposited in a gaming establishment account, via a gaming device, such as an EGM and/or via a non-gaming device, such as a kiosk. In certain embodiments, the system enables a user that has an amount of cash to utilize a gaming device and/or a non-gaming device to convert the cash to an amount deposited into a gaming establishment account (which may be subsequently transferred utilizing a mobile device application). In other embodiments, the system enables funds to be deposited in a gaming establishment account via a gaming device and/or a non-gaming device that accepts printed ticket vouchers. In these embodiments, the system enables a user that has one or more printed ticket vouchers to utilize a gaming device and/or a non-gaming device to convert the printed ticket voucher to an amount deposited into a gaming establishment account (which may be subsequently transferred utilizing a mobile device application).

In certain embodiments, the system enables funds to be deposited in a gaming establishment account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment account (which may be subsequently transferred utilizing a mobile device application). In other embodiments, the system enables funds to be deposited in a gaming establishment account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment account (which may be subsequently transferred utilizing a mobile device application).

In certain embodiments, the gaming establishment account is associated with funds associated with one or more virtual ticket vouchers. In certain embodiments, the system enables a user associated with an amount of virtual ticket vouchers to utilize a gaming device (e.g., an EGM, or a component of an EGM), a non-gaming device (e.g., a kiosk), a mobile device running a mobile device application, and/or a gaming establishment interface to convert the virtual ticket vouchers to an amount deposited into a gaming establishment account.

It should be further appreciated that any functionality or process of the present disclosure may be implemented via one or more servers (associated with or independent of any component of any system disclosed herein), a mobile device application, one or more gaming establishment devices (e.g., a gaming device such as an EGM or a non-gaming device such as a kiosk or a point-of-sale terminal of a retailer located within or otherwise associated with a gaming establishment), and/or one or more components of a gaming establishment system (such as a component of a gaming establishment management system supported by or otherwise located inside a gaming establishment device and/or a non-gaming establishment device). Accordingly: (i) while certain functions, features or processes are described herein as being performed by a non-gaming establishment device, such functions, features or processes may alternatively be performed by one or more servers, or one or more mobile device applications, one or more gaming establishment devices, and/or one or more gaming establishment components, and (ii) while certain functions, features or processes are described herein as being performed by one or more servers (e.g., a server of a gaming establishment fund management system), such functions, features or processes may alternatively be performed by one or more gaming establishment devices, one or more components of a gaming establishment system, one or more non-gaming establishment devices, one or more mobile device applications, or one or more gaming establishment components.

In certain embodiments, the above-described embodiments of the present disclosure may be implemented in accordance with or in conjunction with zero, one or more components of a gaming establishment fund management system (e.g., a cashless wagering system or a gaming establishment retail system); zero, one or more components of a gaming establishment patron management system; and/or zero, one or more gaming establishment devices. In these embodiments, such components of the gaming establishment fund management system, the gaming establishment patron management system, and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the gaming establishment patron management system, and/or the gaming establishment device; (3) accessing memory to configure or reconfigure parameters in the memory according to indicia read from the component of the gaming establishment fund management system, the component of the gaming establishment patron management system, and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the gaming establishment patron management system, and/or the gaming establishment device, while in other embodiments, at least one component of the controller resides outside of the housing of the component of the gaming establishment fund management system, the component of the gaming establishment patron management system, and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the gaming establishment patron management system, and/or the gaming establishment device disclosed herein. In certain embodiments, the at least one memory device resides within the housing of the component of the gaming establishment fund management system, the component of the gaming establishment patron management system, and/or the gaming establishment device, while in other embodiments at least one component of the at least one memory device resides outside of the housing of the component of the gaming establishment fund management system, the component of the gaming establishment patron management system, and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the gaming establishment patron management system, and/or the gaming establishment device; (2) associations between configuration indicia read from the component of the gaming establishment fund management system, the component of the gaming establishment patron management system, and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the gaming establishment patron management system, and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the gaming establishment patron management system, and/or the gaming establishment device to control the component of the gaming establishment fund management system, the component of the gaming establishment patron management system, and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a user uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the gaming establishment patron management system, and/or the gaming establishment device through any suitable data network described above (such as an Internet or intranet).

The at least one memory device also stores a plurality of device drivers. Examples of different types of device drivers include device drivers for the component of the gaming establishment fund management system, the component of the gaming establishment patron management system, and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the component of the gaming establishment patron management system, and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the component of the gaming establishment patron management system, and/or the gaming establishment device loads the new device driver from the at least one memory device to enable communication with the new device. For instance, one type of card reader in the component of the gaming establishment fund management system, the component of the gaming establishment patron management system, and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the gaming establishment patron management system, and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the gaming establishment patron management system, and/or the gaming establishment device. In various embodiments, the display devices serve as digital glass configured to aspects of the gaming establishment in which the component of the gaming establishment fund management system, the component of the gaming establishment patron management system, and/or the gaming establishment device is located. In various embodiments, the component of the gaming establishment fund management system, the component of the gaming establishment patron management system, and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the gaming establishment patron management system, and/or the gaming establishment device receives an actuation, the component of the gaming establishment fund management system, the component of the gaming establishment patron management system, and/or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the gaming establishment patron management system, and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the gaming establishment patron management system, and/or the gaming establishment device. In certain embodiments, the component of the gaming establishment fund management system, the component of the gaming establishment patron management system, and/or the gaming establishment device displays a sequence of audio and/or visual attraction messages during idle periods to attract potential users to the component of the gaming establishment fund management system, the component of the gaming establishment patron management system, and/or the gaming establishment device. The videos may be customized to provide any appropriate information.

The at least one input device may include any suitable device that enables an input signal to be produced and received by the at least one processor of the component of the gaming establishment fund management system, the component of the gaming establishment patron management system, and/or the gaming establishment device. In one embodiment, the at least one input device includes a payment device configured to communicate with the at least one processor of the component of the gaming establishment fund management system, the component of the gaming establishment patron management system, and/or the gaming establishment device to fund the component of the gaming establishment fund management system, the component of the gaming establishment patron management system, and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the gaming establishment patron management system, and/or the gaming establishment device to be funded via an electronic funds transfer, such as a transfer of funds from a bank account. In another embodiment, the component of the gaming establishment fund management system, the component of the gaming establishment patron management system, and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the gaming establishment patron management system, and/or the gaming establishment device. When the component of the gaming establishment fund management system, the component of the gaming establishment patron management system, and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the gaming establishment patron management system, and/or the gaming establishment device operator to, when actuated, cause the component of the gaming establishment fund management system, the component of the gaming establishment patron management system, and/or the gaming establishment device to perform particular functions. For instance, such buttons may be hard keys, programmable soft keys, or icons icon displayed on a display device of the component of the gaming establishment fund management system, the component of the gaming establishment patron management system, and/or the gaming establishment device that are actuatable via a touch screen of the component of the gaming establishment fund management system, the component of the gaming establishment patron management system, and/or the gaming establishment device or via use of a suitable input device of the component of the gaming establishment fund management system, the component of the gaming establishment patron management system, and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the gaming establishment patron management system, and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the gaming establishment patron management system, and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the gaming establishment patron management system, and/or the gaming establishment device, such as one or more rechargeable power sources (e.g., rechargeable batteries) located at the component of the gaming establishment fund management system, the component of the gaming establishment patron management system, and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the gaming establishment patron management system, and/or the gaming establishment device; detecting the presence and/or identity of various persons (e.g., users, casino employees, etc.), devices (e.g., user input devices), and/or systems within a predetermined proximity to the component of the gaming establishment fund management system, the component of the gaming establishment patron management system, and/or the gaming establishment device.

The at least one data preservation component is configured to detect or sense one or more events and/or conditions that, for example, may result in damage to the component of the gaming establishment fund management system, the component of the gaming establishment patron management system, and/or the gaming establishment device and/or that may result in loss of information associated with the component of the gaming establishment fund management system, the component of the gaming establishment patron management system, and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the gaming establishment patron management system, and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the gaming establishment patron management system, and/or the gaming establishment device. For example, in one implementation, the at least one geolocation module is configured to receive GPS signal information for use in determining the position or location of the component of the gaming establishment fund management system, the component of the gaming establishment patron management system, and/or the gaming establishment device. In another implementation, the at least one geolocation module is configured to receive multiple wireless signals from multiple remote devices (e.g., the component of the gaming establishment fund management system, the gaming establishment patron management system, the gaming establishment devices, servers, wireless access points, etc.) and use the signal information to compute position/location information relating to the position or location of the component of the gaming establishment fund management system, the component of the gaming establishment patron management system, and/or the gaming establishment device.

The at least one user identification module is configured to determine the identity of the current user or current owner of the component of the gaming establishment fund management system, the component of the gaming establishment patron management system, and/or the gaming establishment device. For example, in one embodiment, the current user is required to perform a login process at the component of the gaming establishment fund management system, the component of the gaming establishment patron management system, and/or the gaming establishment device in order to access one or more features. Alternatively, the component of the gaming establishment fund management system, the component of the gaming establishment patron management system, and/or the gaming establishment device is configured to automatically determine the identity of the current user based on one or more external signals, such as an RFID tag or badge worn by the current user and that provides a wireless signal to the component of the gaming establishment fund management system, the component of the gaming establishment patron management system, and/or the gaming establishment device that is used to determine the identity of the current user. In at least one embodiment, various security features are incorporated into the component of the gaming establishment fund management system, the component of the gaming establishment patron management system, and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the gaming establishment patron management system, and/or the gaming establishment device.

In various embodiments, the component of the gaming establishment fund management system, the component of the gaming establishment patron management system, and/or the gaming establishment device includes a plurality of communication ports configured to enable the at least one processor of the component of the gaming establishment fund management system, the component of the gaming establishment patron management system, and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the gaming establishment patron management system, and/or the gaming establishment device has a support structure, housing, or cabinet that provides support for a plurality of the input devices and the output devices of the component of the gaming establishment fund management system, the component of the gaming establishment patron management system, and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
a processor; and
a memory device that stores a plurality of instructions that, when executed by the processor, cause the processor to:
responsive to an occurrence of a refunding event associated with a period of inactivity of transactions against a frequent transaction account, cause a transfer of an amount of funds from the frequent transaction account to a gaming establishment account, wherein the frequent transaction account is maintained after at least the amount of funds are transferred from the frequent transaction account to the gaming establishment account, and
communicate data that results in a display device displaying a balance of the gaming establishment account comprising at least the amount of funds transferred from the frequent transaction account, the balance being available for a transaction made against the gaming establishment account.
2. The system of claim 1, wherein the refunding event occurs based on an end of session indicator.

3. The system of claim 2, wherein the end of session indicator is received from any of a remote game server and an online gaming establishment server.
4. The system of claim 1, wherein the transactions against the frequent transaction account comprises any of a plurality of wagers placed on a plurality of plays of an online game and a plurality of sporting event wagers placed.
5. The system of claim 1, wherein the gaming establishment account comprises a cashless wagering account and the transaction made against the gaming establishment account comprises any of a transfer of funds to an electronic gaming machine, and a transfer of funds to a gaming table component.
6. The system of claim 1, wherein the gaming establishment account comprises a gaming establishment retail account and the transaction made against the gaming establishment account comprises a transfer of funds to an account associated with a point-of-sale terminal of a gaming establishment location.
7. The system of claim 1, wherein the amount of funds comprises a balance of the frequent transaction account.
8. A system comprising:
a processor; and
a memory device that stores a plurality of instructions that, when executed by the processor, cause the processor to:
responsive to an occurrence of a refunding event associated with a completion of an online session in which a plurality of wagers were individually transacted against a frequent transaction account, cause a transfer of an amount of funds from the frequent transaction account to another account, wherein the frequent transaction account is maintained after the amount of funds are transferred from the frequent transaction account to the other account, and
communicate data that results in a display device displaying a balance of the gaming establishment account comprising at least the amount of funds transferred from the frequent transaction account.
9. The system of claim 8, wherein data associated with the completion of the online gaming session is received from any of a remote game server and an online gaming establishment server.
10. The system of claim 8, wherein the plurality of wagers individually transacted against the frequent transaction account comprises any of a plurality of wagers placed on a plurality of plays of an online game and a plurality of sporting event wagers placed.
11. The system of claim 8, wherein the other account comprises at least one of a cashless wagering account and a gaming establishment retail account.
12. The system of claim 8, wherein the other account comprises an external account maintained independent of any gaming establishment.
13. The system of claim 8, wherein the amount of funds comprises a balance of the frequent transaction account.
14. A method of operating a system, the method comprising:
responsive to an occurrence of a refunding event associated with a period of inactivity of transactions against a frequent transaction account, causing, by a processor, a transfer of an amount of funds from the frequent transaction account to a gaming establishment account, wherein the frequent transaction account is maintained after at least the amount of funds are transferred from the frequent transaction account to the gaming establishment account, and displaying, by a display device, a balance of the gaming establishment account comprising at least the amount of funds transferred from the frequent transaction account, the balance being available for a transaction made against the gaming establishment account.

15. The method of claim 14, wherein the refunding event occurs based on an end of session indicator.

16. The method of claim 15, wherein the end of session indicator is received from any of a remote game server and an online gaming establishment server.

17. The method of claim 14, wherein the transactions against the frequent transaction account comprises any of a plurality of wagers placed on a plurality of plays of an online game and a plurality of sporting event wagers placed.

18. The method of claim 14, wherein the gaming establishment account comprises a cashless wagering account and the transaction made against the gaming establishment account comprises any of a transfer of funds to an electronic gaming machine, and a transfer of funds to a gaming table component.

19. The method of claim 14, wherein the gaming establishment account comprises a gaming establishment retail account and the transaction made against the gaming establishment account comprises a transfer of funds to an account associated with a point-of-sale terminal of a gaming establishment location.

20. The method of claim 14, wherein the amount of funds comprises a balance of the frequent transaction account.

\* \* \* \* \*